US006950115B2

(12) United States Patent
Brown Elliott

(10) Patent No.: US 6,950,115 B2
(45) Date of Patent: Sep. 27, 2005

(54) COLOR FLAT PANEL DISPLAY SUB-PIXEL ARRANGEMENTS AND LAYOUTS

(75) Inventor: Candice Hellen Brown Elliott, Vallejo, CA (US)

(73) Assignee: Clairvoyante, Inc., Sebastopol, CA (US)

( * ) Notice: Subject to any disclaimer, the term of this patent is extended or adjusted under 35 U.S.C. 154(b) by 346 days.

(21) Appl. No.: 10/024,326

(22) Filed: Dec. 14, 2001

(65) Prior Publication Data

US 2004/0046714 A1 Mar. 11, 2004

Related U.S. Application Data

(60) Provisional application No. 60/290,103, filed on May 9, 2001.

(51) Int. Cl.$^7$ .................................................. G09G 5/00
(52) U.S. Cl. ........................... 345/694; 345/83; 345/695
(58) Field of Search ......................... 345/589, 694–695, 345/82–83, 690, 55, 64, 211; 340/815.45; 362/555

(56) References Cited

U.S. PATENT DOCUMENTS

| | | | |
|---|---|---|---|
| 3,971,065 | A | 7/1976 | Bayer |
| 4,353,062 | A | 10/1982 | Lorteije et al. |
| 4,593,978 | A | 6/1986 | Mourey et al. |
| 4,642,619 | A | 2/1987 | Togashi |
| 4,651,148 | A | 3/1987 | Takeda et al. |
| 4,751,535 | A | 6/1988 | Myers |
| 4,773,737 | A | 9/1988 | Yokono et al. |

(Continued)

FOREIGN PATENT DOCUMENTS

| | | |
|---|---|---|
| DE | 299 09 537 U1 | 10/1999 |
| DE | 199 23 527 A1 | 11/2000 |
| DE | 199-23-527 * | 11/2000 ............ G09G/3/20 |

(Continued)

OTHER PUBLICATIONS

Lee, Baek–woon et al., "40.5L: Late–News Paper: TFT–LCD with RGBW Color System," *SID 03 Digest*, 2003, pp. 1212–1215.

Lee, Baek–woon et al.,"40.5L: Late–News Paper: TFT–LCD with RGBW Color System", SID 03 Digest, 2003, pp. 1212–1215.

R. Martin et al.,"Detectability of reduced blue pixel count in projection displays", Proceedings of the Society for Information Display Symposium Digest, pp. 606–609, May 1993.

(Continued)

*Primary Examiner*—Lao Lun-yi

(57) ABSTRACT

An array comprising a plurality of three-color pixel elements is disclosed. The three-color pixel element has square design disposed at the origin of an X, Y coordinate system. Disposed at the center of the square is a blue emitter. Red emitters are disposed in the second and fourth quadrants not occupied by the blue emitter and green emitters are disposed in the first and third quadrants not occupied by the blue emitter. The blue emitter is square shaped, having corners aligned at the X and Y axes of the coordinate system, and the opposing pairs of red and green emitters are generally square shaped, having truncated inwardly-facing corners forming edges parallel to the sides of the blue emitter. The plurality of three-color pixel elements may be arranged in rows and columns to form a display. Each emitter has a transistor. The column lines and row lines are doubled to allow for the transistors of the red emitters and green emitters to be gathered together into the interstitial corners between the three-color pixel elements creating combined transistor groups. With the transistors grouped together, the combined transistors groups and the blue emitters both become less visible, virtually vanishing from sight almost entirely.

21 Claims, 5 Drawing Sheets

U.S. PATENT DOCUMENTS

| | | | |
|---|---|---|---|
| 4,786,964 A | | 11/1988 | Plummer et al. |
| 4,792,728 A | | 12/1988 | Chang et al. |
| 4,800,375 A | | 1/1989 | Silverstein et al. |
| 4,853,592 A | | 8/1989 | Strathman |
| 4,874,986 A | | 10/1989 | Menn et al. |
| 4,886,343 A | | 12/1989 | Johnson |
| 4,908,609 A | | 3/1990 | Stroomer |
| 4,920,409 A | | 4/1990 | Yamagishi |
| 4,965,565 A | | 10/1990 | Noguchi |
| 4,966,441 A | | 10/1990 | Conner |
| 4,967,264 A | | 10/1990 | Parulski |
| 5,006,840 A | | 4/1991 | Hamada et al. |
| 5,052,785 A | | 10/1991 | Takimoto et al. |
| 5,113,274 A | | 5/1992 | Takahashi et al. |
| 5,132,674 A | | 7/1992 | Bottorf |
| 5,144,288 A | | 9/1992 | Hamada et al. |
| 5,184,114 A | * | 2/1993 | Brown ......................... 345/83 |
| 5,233,385 A | | 8/1993 | Sampsell |
| 5,311,337 A | | 5/1994 | McCartney, Jr. |
| 5,315,418 A | | 5/1994 | Sprague |
| 5,334,996 A | | 8/1994 | Tamagaki |
| 5,341,153 A | | 8/1994 | Benzschawel |
| 5,398,066 A | | 3/1995 | Martinez-Uriegas et al. |
| 5,436,747 A | | 7/1995 | Suzuki |
| 5,461,503 A | | 10/1995 | Deffontaines et al. |
| 5,485,293 A | | 1/1996 | Robinder |
| 5,535,028 A | | 7/1996 | Bae et al. |
| 5,541,653 A | | 7/1996 | Peters et al. |
| 5,559,905 A | | 9/1996 | Greggain et al. |
| 5,561,460 A | | 10/1996 | Katoh et al. |
| 5,563,621 A | | 10/1996 | Silsby |
| 5,579,027 A | | 11/1996 | Sakurai et al. |
| 5,646,702 A | | 7/1997 | Akinwande et al. |
| 5,648,793 A | | 7/1997 | Chen ......................... 345/96 |
| 5,739,802 A | | 4/1998 | Mosier |
| 5,754,226 A | | 5/1998 | Yamada et al. |
| 5,767,837 A | | 6/1998 | Hara |
| 5,792,579 A | | 8/1998 | Phillips |
| 5,815,101 A | | 9/1998 | Fonte |
| 5,821,913 A | | 10/1998 | Mamiya |
| 5,870,075 A | * | 2/1999 | Yamazaki et al. ............. 345/92 |
| 5,949,496 A | | 9/1999 | Kim |
| 5,973,664 A | | 10/1999 | Badger |
| 6,002,446 A | | 12/1999 | Eglit |
| 6,008,868 A | | 12/1999 | Silverbrook |
| 6,034,666 A | | 3/2000 | Kanai et al. |
| 6,037,719 A | * | 3/2000 | Yap et al. ................. 315/169.3 |
| 6,038,031 A | | 3/2000 | Murphy |
| 6,049,626 A | | 4/2000 | Kim |
| 6,061,533 A | | 5/2000 | Kajiwara |
| 6,064,363 A | | 5/2000 | Kwon ......................... 345/98 |
| 6,097,367 A | | 8/2000 | Kuriwaki et al. |
| 6,108,122 A | | 8/2000 | Ulrich et al. |
| 6,144,352 A | * | 11/2000 | Matsuda et al. ............... 345/83 |
| 6,147,664 A | | 11/2000 | Hansen |
| 6,160,535 A | | 12/2000 | Park ......................... 345/153 |
| 6,184,853 B1 | | 2/2001 | Hebiguchi et al. |
| 6,184,903 B1 | | 2/2001 | Omori |
| 6,188,385 B1 | | 2/2001 | Hill et al. |
| 6,198,507 B1 | | 3/2001 | Ishigami |
| 6,219,025 B1 | | 4/2001 | Hill et al. |
| 6,225,967 B1 | | 5/2001 | Hebiguchi |
| 6,225,973 B1 | | 5/2001 | Hill et al. |
| 6,236,390 B1 | | 5/2001 | Hitchcock |
| 6,239,783 B1 | | 5/2001 | Hill et al. |
| 6,243,055 B1 | | 6/2001 | Ferguson |
| 6,243,070 B1 | | 6/2001 | Hill et al. |
| 6,271,891 B1 | | 8/2001 | Ogawa et al. |
| 6,299,329 B1 | | 10/2001 | Mui et al. |
| 6,326,981 B1 | | 12/2001 | Mori et al. |
| 6,327,008 B1 | | 12/2001 | Fujiyoshi |
| 6,332,030 B1 | | 12/2001 | Manjunath |
| 6,335,719 B1 | | 1/2002 | An et al. |
| 6,339,434 B1 | | 1/2002 | West et al. |
| 6,348,929 B1 | | 2/2002 | Acharya |
| 6,360,023 B1 | | 3/2002 | Betrisey et al. |
| 6,377,262 B1 | | 4/2002 | Hitchcock et al. |
| 6,392,717 B1 | | 5/2002 | Kunzman |
| 6,393,145 B2 | | 5/2002 | Betrisey et al. |
| 6,396,505 B1 | | 5/2002 | Lui |
| 6,441,867 B1 | | 8/2002 | Daly |
| 6,453,067 B1 | | 9/2002 | Morgan et al. |
| 6,466,618 B1 | | 10/2002 | Messing et al. |
| 6,476,416 B1 | * | 11/2002 | Ikeda ......................... 257/59 |
| 6,486,923 B1 | | 11/2002 | Maeshima et al. |
| 6,507,350 B1 | * | 1/2003 | Wilson ....................... 345/690 |
| 6,542,161 B1 | | 4/2003 | Koyama et al. |
| 6,545,653 B1 | | 4/2003 | Takahara |
| 6,570,584 B1 | | 5/2003 | Cok et al. |
| 6,590,555 B2 | | 7/2003 | Su et al. |
| 6,597,411 B1 | | 7/2003 | Selby et al. |
| 6,661,429 B1 | | 12/2003 | Phan |
| 6,674,430 B1 | | 1/2004 | Kaufman |
| 6,714,206 B1 | * | 3/2004 | Martin et al. ................ 345/589 |
| 6,738,204 B1 | | 5/2004 | Chuang et al. |
| 6,750,875 B1 | | 6/2004 | Keely, Jr. |
| 6,804,407 B2 | | 10/2004 | Weldy |
| 2001/0017515 A1 | | 8/2001 | Kusunoki et al. |
| 2001/0017607 A1 | | 8/2001 | Kwon et al. |
| 2001/0040645 A1 | | 11/2001 | Yamazaki |
| 2002/0012071 A1 | | 1/2002 | Sun |
| 2002/0015110 A1 | | 2/2002 | Elliott |
| 2002/0017645 A1 | | 2/2002 | Yamazaki |
| 2002/0122160 A1 | | 9/2002 | Kunzman |
| 2002/0140831 A1 | | 10/2002 | Hayashi |
| 2002/0190648 A1 | | 12/2002 | Bechtel et al. |
| 2003/0006978 A1 | | 1/2003 | Fujiyoshi |
| 2003/0011603 A1 | | 1/2003 | Koyama |
| 2003/0011613 A1 | | 1/2003 | Booth, Jr. |
| 2003/0043567 A1 | | 3/2003 | Hoelen et al. |
| 2003/0071826 A1 | | 4/2003 | Goertzen |
| 2003/0071943 A1 | | 4/2003 | Choo et al. |
| 2003/0077000 A1 | | 4/2003 | Blinn |
| 2003/0218618 A1 | | 11/2003 | Phan |
| 2004/0213449 A1 | | 10/2004 | Safaee-Rad |
| 2004/0247070 A1 | | 12/2004 | Ali |

FOREIGN PATENT DOCUMENTS

| | | | |
|---|---|---|---|
| DE | 199 23 527 | 11/2000 | ............ G09G/3/20 |
| DE | 201 09 354 U1 | 9/2001 | |
| EP | 0 158 366 A2 | 10/1985 | |
| EP | 0 203 005 A1 | 11/1986 | |
| EP | 0 322 106 A2 | 6/1989 | |
| EP | 0 671650 A2 | 9/1995 | |
| EP | 0 671 650 | 9/1995 | ......... G02F/1/1343 |
| EP | 0 812 114 A1 | 12/1997 | |
| EP | 0 878 969 | 11/1998 | ............ H04N/9/30 |
| EP | 0 899604 A2 | 3/1999 | |
| EP | 1 261 014 A2 | 11/2002 | |
| EP | 1 381 020 | 1/2004 | |
| GB | 2 133 912 A | 8/1984 | |
| GB | 2 146 478 A | 4/1985 | |
| JP | 60-107022 | 6/1985 | |
| JP | 02-000826 A | 1/1990 | |
| JP | 03-78390 | 4/1991 | |
| JP | 03-036239 B | 5/1991 | |
| JP | 06-102503 | 4/1994 | |
| JP | 02-983027 B2 | 11/1999 | |
| WO | WO 00/21067 | 4/2000 | |
| WO | WO 00/42564 | 7/2000 | |
| WO | WO 00/42762 | 7/2000 | |

| | | |
|---|---|---|
| WO | WO 00/45365 | 8/2000 |
| WO | WO 00/65432 | 11/2000 |
| WO | WO 00/67196 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/059685 A2 | 8/2002 |
| WO | WO 02/099557 A2 | 12/2002 |
| WO | WO 02/101644 A2 | 12/2002 |
| WO | WO 03/014819 A1 | 2/2003 |

OTHER PUBLICATIONS

Messing, Dean S. et al., "Improved Display Resolution of Subsampled Colour Images Using Subpixel Addressing" IEEE ICIO 2002.

Messing, Dean S. et al., "Subpixel Rendering on Non-Striped Colour Matrix Displays" 2003 International Conference on Image Processing, Sep. 2003, Barcelona, Spain.

Krantz, John H et al., "Color Matrix Display Image Quality: The Effects of Luminance and Spatial Sampling", SID 90 Digest.

BrownElliott, C H., "Reducing Pixel Count Without Reducing Image Quality", Information Display, 15:22–25, Dec. 1999.

Adobe Systems, Inc., website, 2002, http://www.adobe.com/products/acrobat/cooltype.html.

Betrisey, C., et al., "Displaced Filtering for Patterned Displays," 2000, *Society for Information Display (SID) 00 Digest*, pp. 296–299.

Carvajal, D., "Big Publishers Looking Into Digital Books," Apr. 3, 2000, *The New York Times*, Business/Financial Desk.

Elliott, C., "New Pixel Layout for PenTile Matrix," Jan. 2002, Proceedings of the International Display Manufacturing Conference, pp. 115–117.

Gibson Research Corporation, website, "Sub-Pixel Font Rendering Technology, How It Works," 2002, http://www.grc.com/ctwhat.html.

Microsoft Corporation, website, 2002, http://www.microsoft.com/reader/ppc/product/cleartype.html.

Microsoft Press Release, Nov. 15, 1998, Microsoft Research Announces Screen Display Breakthrough at COMDEX/Fall '98, PR Newswire.

Murch, M., "Visual Perception Basics," 1987, *SID*, Seminar 2, Tektronix, Inc., Beaverton, Oregon.

Wandell, Brian A., Stanford University, "Fundamentals of Vision: Behavior, Neuroscience and Computation," Jun. 12, 1994, *Society for Information Display (SID) Short Course S-2*, Fairmont Hotel, San Jose, California.

C. Elliott, "Reducing Pixel Count without Reducing Image Quality", *Information Display*, vol. 15, pp. 22–25, Dec. 1999.

C. Elliott, "Active Matrix Display Layout Optimization for Sub-pixel Image Rendering", *IDMC 2000*, pp. 185–189, Aug. 2000.

H. Okumura, "A New Flicker-Reduction Drive Method for High-Resolution LCTVs", *SID '01 Digest*, pp. 551–554, 2001, no month.

"ClearType magnified," *Wired Magazine*, Nov. 8, 1999, Microsoft Typography, article posted Nov. 8, 1999, and last updated Jan. 27, 1999, © 1999 Microsoft Corporation, 1 page.

Credelle, Thomas L. et al., "P–00: MTF of High–Resolution PenTile Matrix™ Displays," *Eurodisplay 02 Digest*, 2002, pp. 1–4.

Daly, Scott, "Analysis of Subtriad Addressing Algorithms by Visual System Models," *SID Symp. Digest*, Jun. 2001, pp. 1200–1203.

Elliott, Candice H. Brown et al., "Color Subpixel Rendering Projectors and Flat Panel Displays," New Initiatives in Motion Imaging, SMPTE Advanced Motion Imaging Conference, Feb. 27–Mar. 1, 2003, Seattle, Washington, pp. 1–4.

Elliott, Candice H. Brown et al., "Co-optimization of Color AMLCD Subpixel Architecture and Rendering Algorithms," *SID Symp. Digest*, May 2002, pp. 172–175.

Feigenblatt, R.I., "Full–color imaging on amplitude–quantized color mosaic displays," *SPIE*, vol. 1075, Digital Image Processing Applications, 1989, pp. 199–204.

Johnston, Stuart J., "An Easy Read: Microsoft's ClearType," *InformationWeek Online*, Redmond, WA, Nov. 23, 1998, 3 pages.

Johnston, Stuart J., "Clarifying ClearType," *InformationWeek Online*, Redmond, WA, Jan. 4, 1999, 4 pages.

"Just Outta Beta," *Wired Magazine*, Dec. 1999, Issue 7.12, 3 pages.

Klompenhouwer, Michiel A. et al., "Subpixel Image Scaling for Color Matrix Displays," *SID Symp. Digest*, May 2002, pp. 176–179.

Markoff, John, "Microsoft's Cleartype Sets Off Debate on Originality," *The New York Times*, Dec. 7, 1998, 5 pages.

"Microsoft ClearType," http://www.microsoft.com/opentype/cleartype, Sep. 26, 2002, 4 pages.

Platt, John C., "Optimal Filtering for Patterned Displays," Microsoft Research, *IEEE Signal Processing Letters*, 2000, 4 pages.

Platt, John, "Technical Overview of ClearType Filtering," Microsoft Research, http://research.microsoft.com/users/jplatt/cleartype/default.aspx, Sep. 17, 2002, 3 pages.

Poor, Alfred, "LCDs: The 800–pound Gorilla," *Information Display*, Sep. 2002, pp. 18–21.

"Ron Feigenblatt's remarks on Microsoft ClearType™," http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.

"Sub–Pixel Font Rendering Technology," © 2003 Gibson Research Corporation, Laguna Hills, CA, 2 pages.

Werner, Ken, "OLEDs, OLEDs, Everywhere . . . ," *Information Display*, Sep. 2002, pp. 12–15.

\* cited by examiner

_COLOR FLAT PANEL DISPLAY SUB-PIXEL ARRANGEMENTS AND LAYOUTS_

CROSS-REFERENCE TO RELATED APPLICATION

The present application claims the benefit of the date of the U.S. Provisional Patent Application Ser. No. 60/290,103, entitled "Improvements to Color Flat Panel Display Sub-Pixel Arrangements and Layouts", filed on May 9, 2001, which is incorporated herein in its entirety.

BACKGROUND

The present application relates to improvements to display layouts, and specifically to improved color pixel arrangements and means of addressing used in displays.

The present state of the art of color single plane imaging matrix, for flat panel displays use the red-green-blue (RGB) color triad or a single color in a vertical stripe as shown in prior art FIG. 1. Prior art FIG. 1 shows an arrangement 10 having several three-color pixel elements with red emitters (or sub-pixels) 14, blue emitters 16, and green emitters 12. The arrangement takes advantage of the Von Bezold effect by separating the three colors and placing equal spatial frequency weight on each color. However, this panel suffers because of inadequate attention to how human vision operates. These types of panels are a poor match to human vision.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chromanance, and motion. Motion is only important for flicker threshold to the imaging system designer. The luminance channel takes the input from only the red and green receptors. It is "color blind". It processes the information in such a manner that the contrast of edges is enhanced. The chromanance channel does not have edge contrast enhancement. Since the luminance channel uses and enhances every red and green receptor, the resolution of the luminance channel is several times higher than the chromanance channels. The blue receptor contribution to luminance perception is negligible. The luminance channel acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the diagonal axes is significantly lower.

The chromanance channel is further subdivided into two sub-channels, to allow us to see full color. These channels are quite different from the luminance channel, acting as low pass filters. One can always tell what color an object is, no matter how big it is in our field of view. The red/green chromanance sub-channel resolution limit is at 8 cycles/°, while the yellow/blue chromanance sub-channel resolution limit is at 4 cycles/°. Thus, the error introduced by lowering the blue resolution by one octave will be barely noticeable by the most perceptive viewer, if at all, as experiments at Xerox and NASA, Ames Research Center (R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270$\mu$) on a display. Thus, if the blue pixel pitch is less than half (625$\mu$) of this blending pitch, the colors will blend without loss of picture quality. This blending effect is directly related to the chromanance sub-channel resolution limits described above. Below the resolution limit, one sees separate colors, above the resolution limit, one sees the combined color.

Examining the conventional RGB stripe display in prior art FIG. 1, the design assumes that all three colors have the same resolution. The design also assumes that the luminance information and the chromanance information have the same spatial resolution. Further, keeping in mind that the blue sub-pixel is not perceived by the human luminance channel and is therefore seen as a black dot, and since the blue sub-pixel is aligned in stripes, the human viewer sees vertical black lines on the screen as shown in FIG. 2. The image displayed has large areas of white space, such as when displaying black text on a white background. These stripes are viewed as a distracting screen artifact. Typical higher resolution prior art displays have pixel densities of 90 pixels per inch. At an average viewing distance of 18 inches, this represents approximately 28 pixels per degree or approximately 14 cycles/°, when showing lines and spaces at the highest Modulation Transfer Function (MTF) allowed by the display. However, what the luminance channel sees is an approximately 28 cycles/° signal horizontally across a white image when considering that the blue sub-pixel 12 is dark compared to the red 14 and green 16 emitters, as shown in prior art FIG. 2. This 28 cycles/° artifact is closer to the peak luminance channel response spatial frequency, 35 cycles/°, than the desired image signal, 14 cycles/°, thus competing for the viewer's attention.

Thus, the prior art arrangement of three-color emitters is shown to be a poor match to human vision.

SUMMARY

A system of addressing an array of color pixels for a flat panel display is disclosed. More particularly, the layout of column and row drive lines and transistors of three-color pixel element of spaced-apart emitters is disclosed.

The three-color pixel element has square design disposed at the origin of an X, Y coordinate system. Disposed at the center of the square is a blue emitter. Red emitters are disposed in the second and fourth quadrants not occupied by the blue emitter and green emitters are disposed in the first and third quadrants not occupied by the blue emitter. The blue emitter is square shaped, having corners aligned at the X and Y axes of the coordinate system, and the opposing pairs of red and green emitters are generally square shaped, having truncated inwardly-facing corners forming edges parallel to the sides of the blue emitter. The plurality of three-color pixel elements may be arranged in rows and columns to form a display. This array provides better perceived resolution and appearance of single full color displays by matching the human vision system.

Each emitter has a transistor and associated components or structures, such as capacitors. The column lines and row lines are doubled to allow for the transistors and associated structures of the red emitters and green emitters to be gathered together at the interstitial corners between the three-color pixel elements creating combined transistor groups. With the transistors grouped together, the combined transistors groups and the blue emitters both become less visible at 56 cycles/°, virtually vanishing from sight almost entirely.

BRIEF DESCRIPTION OF THE DRAWINGS

Referring now to the figures, wherein like elements are numbered alike.

DETAILED DESCRIPTION

Those of ordinary skill in the art will realize that the following is illustrative only and not in any way limiting. Other embodiments will readily suggest themselves to such skilled persons.

Figure 3:
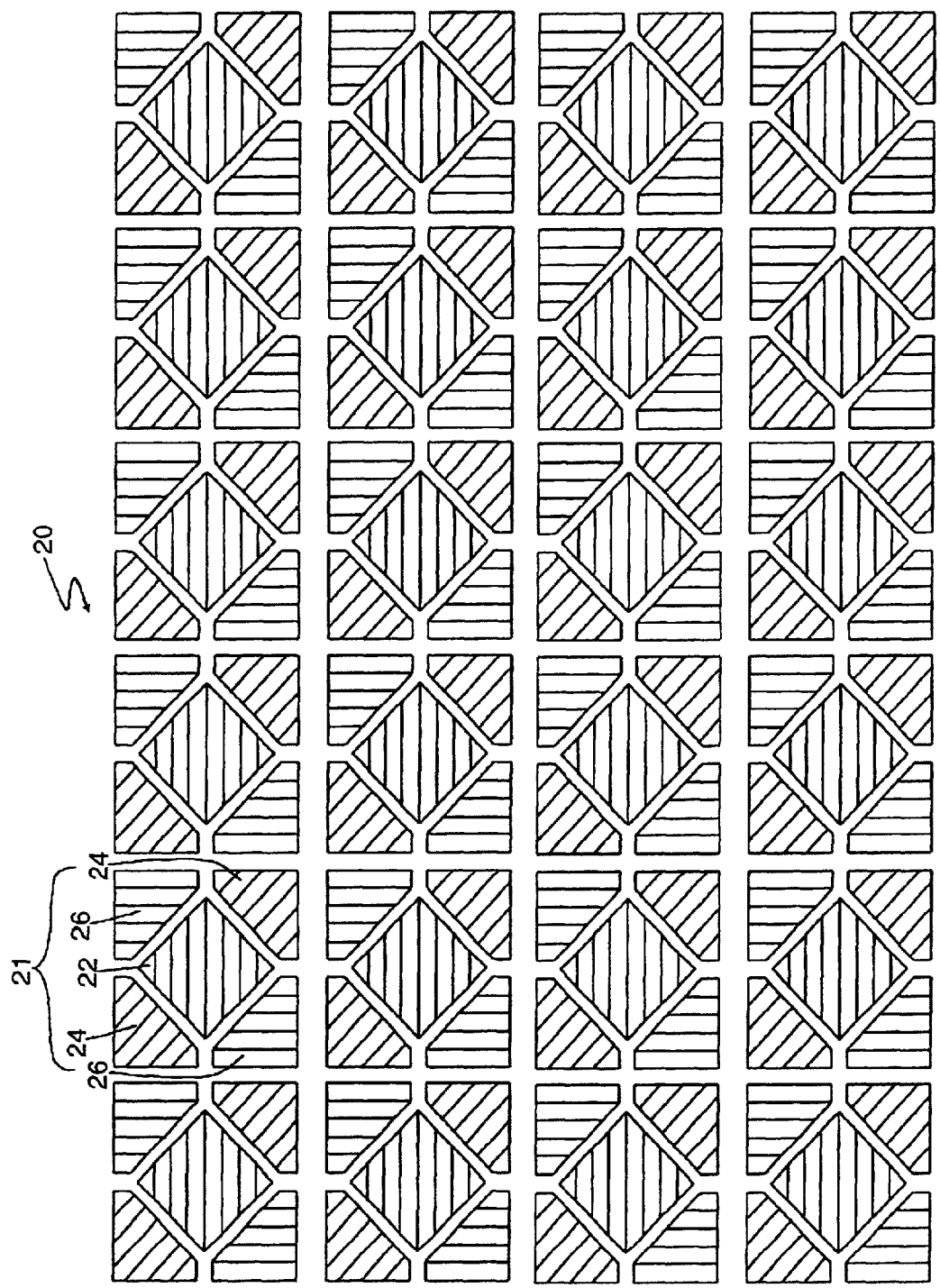
FIG. 3 illustrates an arrangement of three-color pixel elements in an array, in a single plane, for a display device.

FIG. 3 illustrates an arrangement 20 of several three-color pixel elements according to a preferred embodiment. A three-color pixel element 21 consists of a blue emitter (or sub-pixel) 22, two red emitters 24, and two green emitters 26 in a square, which is described as follows. The three-color pixel element 21 is square shaped and is centered at the origin of an X, Y coordinate system. The blue emitter 22 is centered at the origin of the square and extends into the first, second, third, and fourth quadrants of the X, Y coordinate system. A pair of red emitters 24 are disposed in opposing quadrants (i.e., the second and the fourth quadrants), and a pair of green emitters 26 are disposed in opposing quadrants (i.e., the first and the third quadrants), occupying the portions of the quadrants not occupied by the blue emitter 22. As shown in FIG. 3, the blue emitter 22 can be square-shaped, having corners aligned at the X and Y axes of the coordinate system, and the opposing pairs of red 24 and green 26 emitters can be generally square shaped, having truncated inwardly-facing corners forming edges parallel to the sides of the blue emitter 22.

The array is repeated across a panel to complete a device with a desired matrix resolution. The repeating three-color pixels form a "checker board" of alternating red 24 and green 26 emitters with blue emitters 22 distributed evenly across the device. However, the blue emitters 22 are at half the resolution of the red 24 and green 26 emitters.

One advantage of the three-color pixel element array is improved resolution of color displays. This occurs since only the red and green emitters contribute significantly to the perception of high resolution in the luminance channel. Thus, reducing the number of blue emitters and replacing some with red and green emitters improves resolution by more closely matching human vision.

Dividing the red and green emitters in half in the vertical axis to increase spatial addressability is an improvement over the conventional vertical single color stripe of the prior art. An alternating "checkerboard" of red and green emitters allows the Modulation Transfer Function (MTF), high spatial frequency resolution, to increase in both the horizontal and the vertical axes. A further advantage of this arrangement over prior art is the shape and location of the blue emitter.

Figure 1:
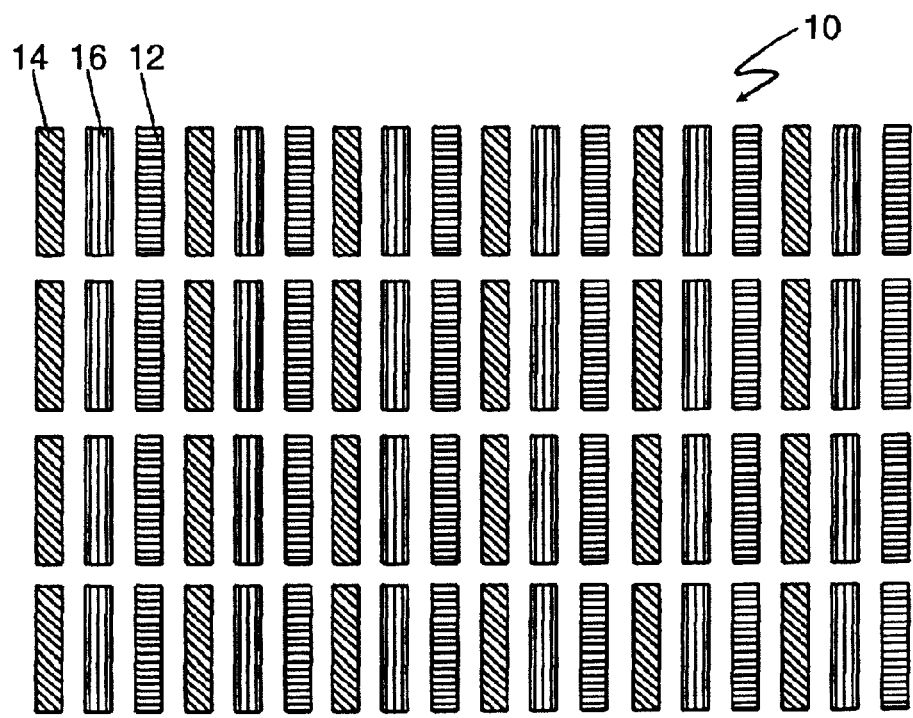
FIG. 1 illustrates a prior art RGB stripe arrangement of three-color pixel elements in an array, a single plane, for a display device.
Figure 2:
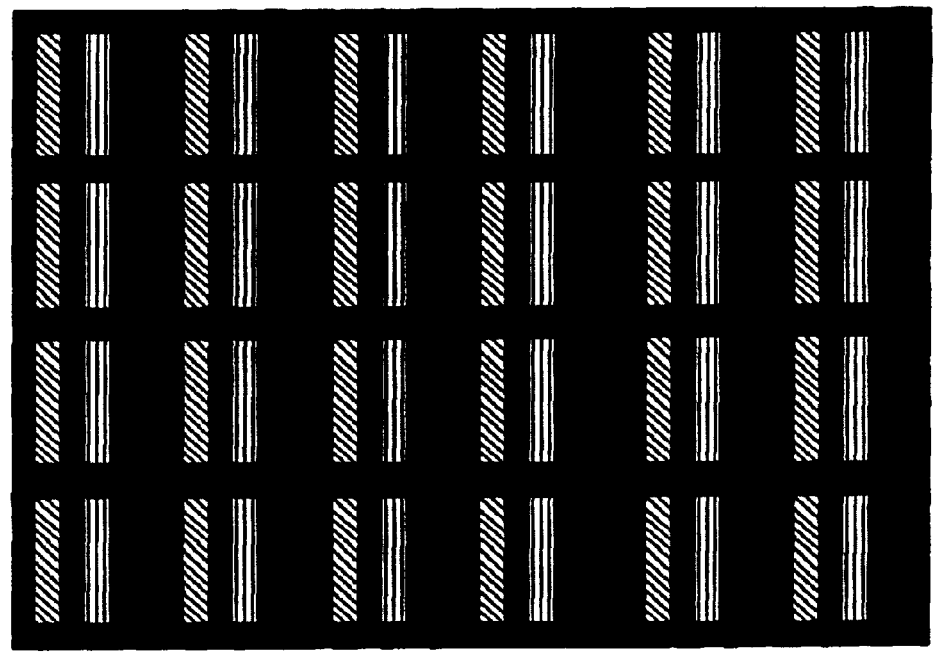
FIG. 2 illustrates a prior art RGB stripe arrangement as it would be perceived by the luminance channel of the human vision system when a full white image is displayed.
Figure 4:
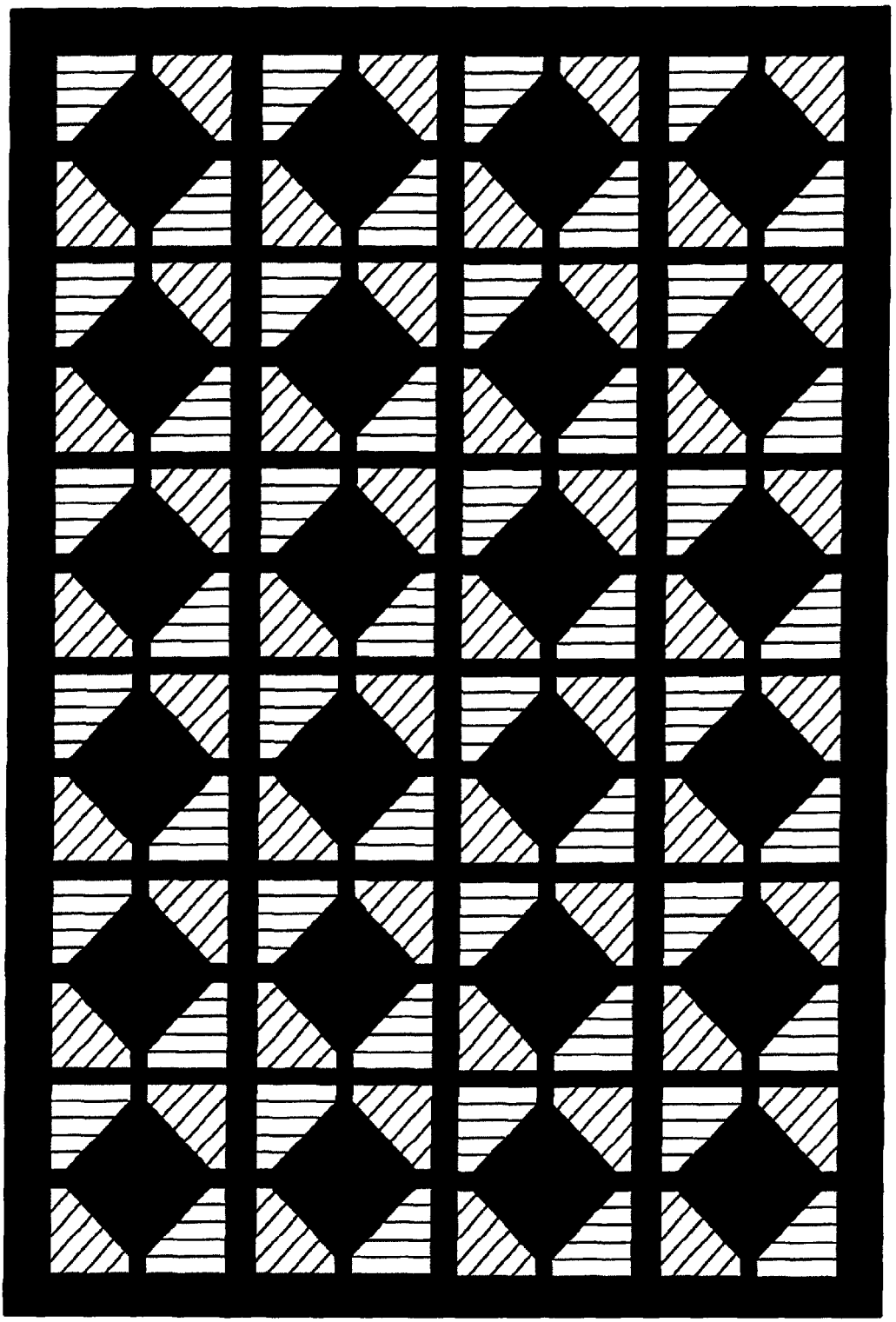
FIG. 4 illustrates the arrangement of FIG. 3, as the luminance channel of the human vision system would perceive it when a full white image is displayed.

In the prior art arrangement of FIG. 1, the blue emitters are in stripes. When viewed, the luminance channel of the human vision system sees these blue emitters as black stripes alternating with white stripes, as illustrated in prior art FIG. 2. In the horizontal direction, there are faint, but discernable lines between rows of three-color pixel elements, largely due to the presence of the transistors, and/or associated structures, such as capacitors, at each emitter, as is common in the art. However, with the arrangement of FIG. 3, when viewed, the luminance channel of the human vision system sees black dots alternating with white dots as illustrated in FIG. 4. This is an improvement because the spatial frequency, Fourier Transform wave component, energy is now spread into every axis, vertical, diagonal, as well as horizontal, reducing the amplitude of the original horizontal signal, and thus, the visual response (i.e., visibility).

Figure 5:
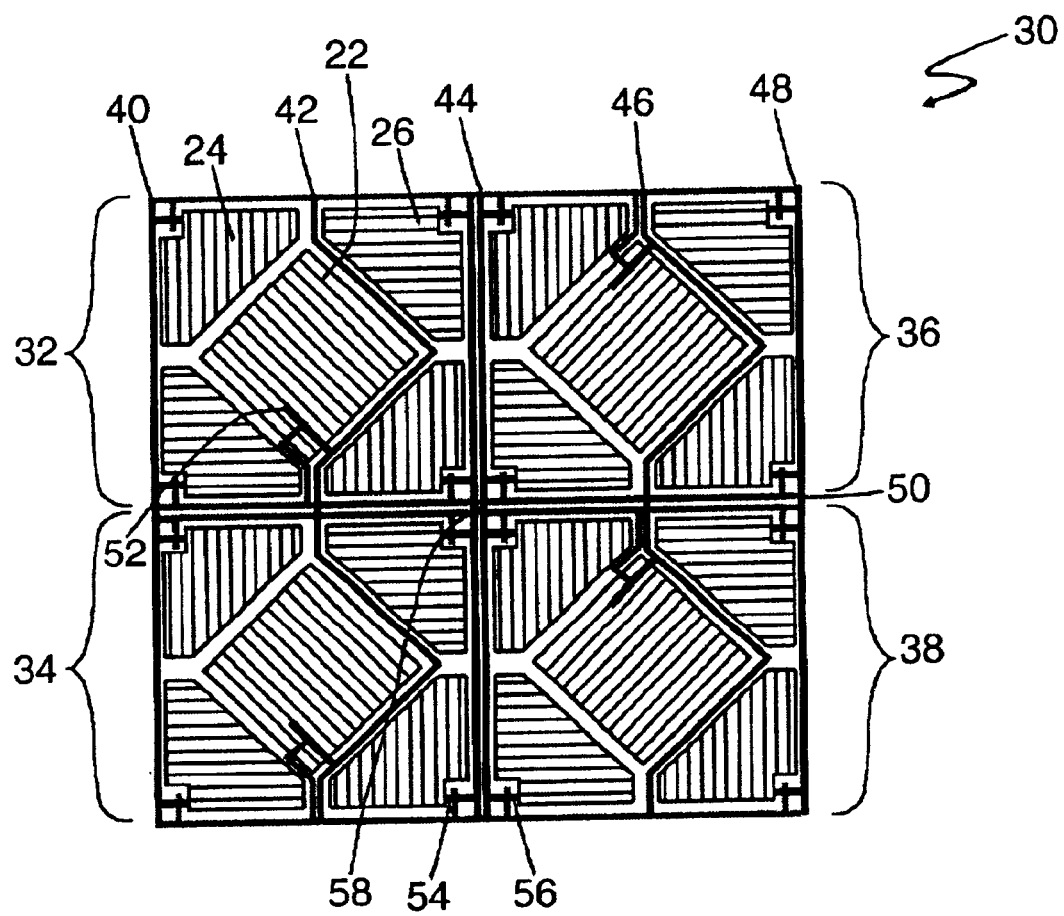
FIG. 5 illustrates a layout of drive lines and transistors for the arrangement of pixel elements of FIG. 4.

FIG. 5 illustrates a preferred embodiment wherein only four three-color pixel elements 32, 34, 36, and 38 are grouped in arrangement 30, while several thousand can be arranged in an array. Column address drive lines 40, 42, 44, 46, and 48 and row address drive line 50 drive each three color pixel element 32, 34, 36, and 38. Each emitter has a transistor, and possibly associated structures such as a capacitor, which may be a sample/hold transistor/capacitor circuit. Therefore, each blue emitter 22 has a transistor 52, each red emitter 24 has a transistor 54, and each green emitter 26 has a transistor 56. Having two column lines 44 and two row lines 50 allows for the transistors, and/or associated structures, for the red emitters and green emitters to be gathered together into the interstitial corners between the three-color pixel elements 32, 34, 36, and 38 creating combined transistor groups 58.

Figure 6:
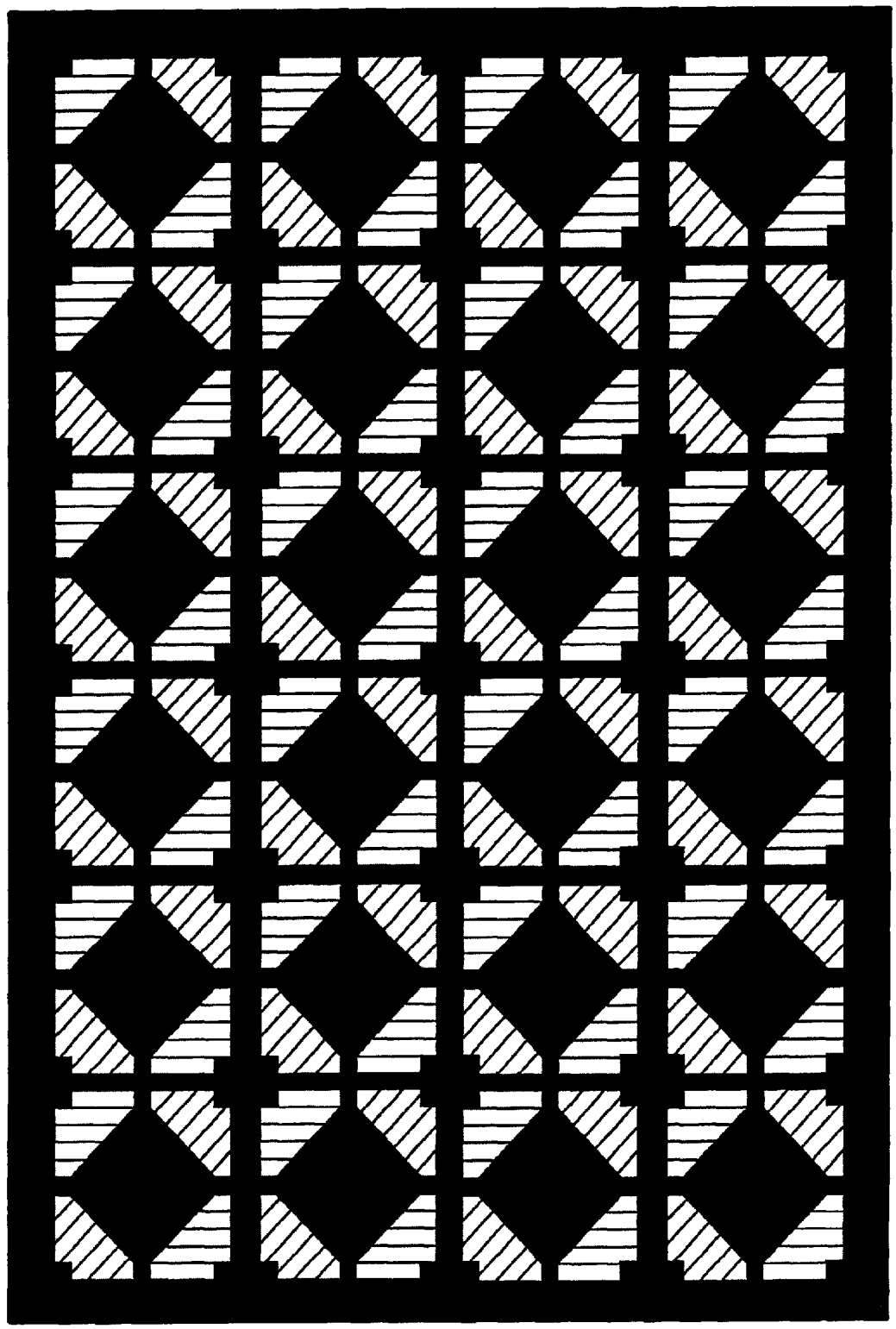
FIG. 6 illustrates the arrangement of FIG. 5, as it would be perceived by the luminance channel of the human vision system, prior to filtering, when a full white image is displayed.

The grouping of the transistors and/or associated structures, such as capacitors, in the interstitial corners appears to be counter to good design practice, as understood in the prior art, since collecting them together makes them a bigger, and thus more visible dark spot, as shown in FIG. 6. However, in this circumstance these dark spots are exactly halfway between the blue emitter 22 in each three-color pixel element.

In this embodiment, the spatial frequency of the combined transistor groups and/or associated structures, 58 and the blue emitter 22 is doubled, pushing them above the 50 cycles/° resolution limit of the luminance channel of human vision. For example, in a 90 pixel per inch display panel the blue emitter pitch, without the grouped transistors, would create a 28 cycles/° luminance channel signal, both horizontally and vertically. In other words, the blue emitters may be visible as a texture on solid white areas of a display. However, they will not be as visible as the stripes visible in the prior art.

In contrast, with the transistors grouped together, the combined group transistors 58 and the blue emitters 22 both become less visible at 56 cycles/°, virtually vanishing from sight almost entirely. In other words, the grouping of the transistors and the blue emitters combine to produce a texture on solid white areas of a display too fine for the human visual system to see. In using this embodiment, the solid white areas become as smooth looking as a sheet of paper.

The grouping of the transistors, and/or associated structures, and placement of the blue emitters work together to match to human vision. In contrast to the prior art, which creates black lines with the placement of the blue emitters and transistor, the arrangement of the present invention removes this problem. In placing the transistors in accordance with the above arrangements, the transistors and blue emitters vanish from sight almost entirely providing a smooth looking display without a visible texture.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An array, comprising:
   a plurality of three-color pixel elements, wherein each said three-color pixel element comprises:
   a blue emitter disposed at a center of a square disposed at an origin of an X, Y coordinate system having a first, a second, a third, and a fourth quadrant, wherein said blue emitter is square-shaped;
   a pair of red emitters spaced apart from said blue emitter and symmetrically disposed about said blue emitter in said second and said fourth quadrants, wherein said red emitters occupy a portion of said second and said fourth quadrants not occupied by said blue emitter, wherein said red emitters are generally square-shaped having truncated inwardly-facing corners forming edges parallel to sides of said blue emitter;
   a pair of green emitters spaced apart from said blue emitter and symmetrically disposed about said blue emitter in said first and said third quadrants, wherein said green emitters occupy a portion of said first and said third quadrants not occupied by said blue emitter, wherein said green emitters are generally square-shaped having truncated inwardly-facing corners forming edges parallel to sides of said blue emitter;
   wherein said array is repeated across a panel to complete a device with a desired matrix resolution forming a checker board of alternating said red emitters and said green emitters with said blue emitters distributed evenly across said device, wherein said blue emitters are at half resolution of said red emitters and said green emitters;
   a first transistor for said blue emitter, a second transistor for said red emitter, and a third transistor for said green emitter, wherein said second and third transistors are grouped together at interstitial corners between said three-color pixel elements; and
   column lines and row lines connecting to said first, second, and third transistors, wherein two of said column lines and two of said row lines are coupled to said second and third transistors in said interstitial corners.

2. The array of claim 1, further comprising associated structures connected to said first, second, and third transistors.

3. The array of claim 2, wherein said associated structures are capacitors.

4. An array, comprising:
   a plurality of three-color pixel elements, wherein each said three-color pixel element comprises:
   a blue emitter disposed at a center of a square disposed at an origin of an X, Y coordinate system having a first, a second, a third, and a fourth quadrant, wherein said blue emitter is square-shaped;
   a pair of red emitters spaced apart from said blue emitter and symmetrically disposed about said blue emitter in said second and said fourth quadrants, wherein said red emitters occupy a portion of said second and said fourth quadrants not occupied by said blue emitter, wherein said red emitters are generally square-shaped having truncated inwardly-facing corners forming edges parallel to sides of said blue emitter;
   a pair of green emitters spaced apart from said blue emitter and symmetrically disposed about said blue emitter in said first and said third quadrants, wherein said green emitters occupy a portion of said first and said third quadrants not occupied by said blue emitter, wherein said green emitters are generally square-shaped having truncated inwardly-facing corners forming edges parallel to said sides of said blue emitter; and
   transistors coupled to said blue emitters, said red emitters, and said green emitters;
   wherein said array is repeated across a panel to complete a device with a desired matrix resolution forming a checker board of alternating said red emitters and said green emitters with said blue emitters are distributed at a spatial frequency, wherein said blue emitters are at half resolution of said red emitters and said green emitters;
   wherein said transistors for said red emitters and said green emitters are grouped together at interstitial corners between said three-color pixel elements;
   column lines and row lines connecting to said transistors, wherein two of said column lines and two of said row lines are coupled to said transistors for said red emitters and said green emitters in said interstitial corners; and
   wherein said transistors for said red emitters and said green emitters are disposed at locations in said array such that said transistors for said red emitters and said green emitters are disposed at said spatial frequency said blue emitters and are 180 degrees out of phase with said blue emitters, said transistors for said red emitters and said green emitters being sized to have a luminance value equal to a luminance value of said blue emitters.

5. The array of claim 4, further comprising associated structures connected to said transistors.

6. The array of claim 5, wherein said associated structures are capacitors.

7. The array of claim 4, wherein a radiance value of said red emitters and said green emitters is substantially equal to a radiance value of said blue emitters.

8. The array of claim 7, wherein said luminance value of said red emitters and said green emitters is substantially equal to said radiance value of said blue emitters is adjusted to provide a desired white color point.

9. An array, comprising:
a plurality of three-color pixel elements, wherein each said three-color pixel element comprises a blue emitter, a pair of red emitters, and a pair of green emitters arranged in a square design;
wherein said array is repeated across a panel to complete a device with a desired matrix resolution forming a checker board of alternating said red emitters and said green emitters with said blue emitters distributed evenly across said device, wherein said blue emitters are at half resolution of said red emitters and said green emitters;
a first transistor for said blue emitter, a second transistor for said red emitter, and a third transistor for said green emitter, wherein said second and third transistors are grouped together at interstitial corners between said three-color pixel elements; and
column lines and row lines connecting to said first, second, and third transistors, wherein two of said column lines and two of said row lines are coupled to said second and third transistors in said interstitial corners.

10. The array of claim 9, further comprising associated structures connected to said first, second, and third transistors.

11. The array of claim 10, wherein said associated structures are capacitors.

12. An array, comprising:
a plurality of three-color pixel elements, wherein each said three-color pixel element comprises a blue emitter, a pair of red emitters, and a pair of green emitters disposed in a square design, and transistors coupled to said blue emitters, said red emitters, and said green emitters;
wherein said array is repeated across a panel to complete a device with a desired matrix resolution forming a checker board of alternating said red emitters and said green emitters with said blue emitters are distributed at a spatial frequency, wherein said blue emitters are at half resolution of said red emitters and said green emitters;
wherein said transistors for said red emitters and said green emitters are grouped together at interstitial corners between said three-color pixel elements;
column lines and row lines connecting to said transistors, wherein two of said column lines and two of said row lines are coupled to said transistors for said red emitters and said green emitters in said interstitial corners; and
wherein said transistors for said red emitters and said green emitters are disposed at locations in said array such that said transistors for said red emitters and said green emitters are disposed at said spatial frequency of said blue emitters and are 180 degrees out of phase with said blue emitters, said transistors for said red emitters and said green emitters being sized to have a luminance value equal to a luminance value of said blue emitters.

13. The array of claim 12, further comprising associated structures connected to said transistors.

14. The array of claim 13, wherein said associated structures are capacitors.

15. The array of claim 12, wherein a radiance value of said red emitters and said green emitters is substantially equal to a radiance value of said blue emitters.

16. The array of claim 15, wherein said luminance value of said red emitters and said green emitters is substantially equal to said radiance value of said blue emitters is adjusted to provide a desired white color point.

17. A pixel element for a display comprising:
a pair of red emitters disposed about an origin in a substantially rectangular coordinate system having four quadrants in a first pair of opposing quadrants;
a pair of green emitters disposed about said origin in said substantially said rectangular coordinate system in a second pair of opposing quadrants;
a blue emitter disposed at said origin of said rectangular coordinate system; wherein each said red emitter and said green emitter is coupled to a transistor and such that each such transistor for said red and green emitter is substantially located in a interstitial corner of said substantially rectangular coordinate system.

18. A display comprising substantially a plurality of three-color pixel elements, said three-color pixel element comprising:
a pair of red emitters;
a pair of green emitters; such that said red emitters and said green emitters substantially form a checkerboard pattern;
a blue emitter disposed at a center of said checkerboard pattern of said red emitters and green emitters; and
wherein each said red emitter and green emitter is connected to a transistor such that said transistors for said red and green emitters substantially form a dark spot in the interstitial corners between said pixel elements.

19. The display of claim 18 wherein each said emitter is independently addressable.

20. The display of claim 19 wherein each emitter is capable of being driven with a variable analog signal.

21. The display of claim 18 wherein said red emitters and said green emitters comprise a length approximately one half in the vertical axis to improve spatial addressability.

* * * * *